(12) United States Patent
Ullein

(10) Patent No.: US 6,406,391 B1
(45) Date of Patent: Jun. 18, 2002

(54) CHAIN TENSIONER

(75) Inventor: Thomas Ullein, Stegaurach (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/402,605

(22) PCT Filed: Mar. 16, 1998

(86) PCT No.: PCT/EP98/01508

§ 371 (c)(1),
(2), (4) Date: Jan. 10, 2000

(87) PCT Pub. No.: WO98/49463

PCT Pub. Date: Nov. 5, 1998

(30) Foreign Application Priority Data

Apr. 25, 1997 (DE) ............ 197 17 409

(51) Int. Cl.⁷ ............ F16H 7/08; F16H 7/18; F16H 7/22
(52) U.S. Cl. ............ 474/101; 111/140; 111/133
(58) Field of Search ............ 474/101, 117, 474/111, 140, 144, 118, 113, 114, 136, 138, 137, 132

(56) References Cited

U.S. PATENT DOCUMENTS

| | | |
|---|---|---|
| 3,069,835 A | 12/1962 | Steichelle |
| 3,358,522 A | 12/1967 | Poyser et al. |
| 3,402,617 A | 9/1968 | Fox |
| 4,395,250 A * | 7/1983 | King ............ 474/111 |
| 4,505,691 A * | 3/1985 | Kohler ............ 474/101 |
| 4,764,157 A | 8/1988 | Brandenstein et al. |
| 5,425,680 A * | 6/1995 | Young ............ 474/111 |
| 5,484,340 A | 1/1996 | Campbell et al. |
| 5,662,540 A * | 9/1997 | Schnuepke et al. ............ 474/111 |

FOREIGN PATENT DOCUMENTS

| | | | |
|---|---|---|---|
| DE | 908694 | 4/1954 | |
| DE | 4437926 | 2/1996 | |
| DE | 19536643 | 4/1997 | |
| DE | 29700735 | 7/1998 | |
| EP | 113685 | * 7/1984 | ............ 474/111 |
| EP | 195945 | * 10/1986 | ............ 474/111 |
| EP | 581219 | * 2/1994 | ............ 474/111 |
| EP | 0656464 | 6/1995 | |
| GB | 155646 | 12/1920 | |
| JP | 79842 | * 4/1991 | ............ 474/111 |

* cited by examiner

Primary Examiner—David A. Bucci
Assistant Examiner—Marcus Charles
(74) Attorney, Agent, or Firm—Bierman, Muserlian and Lucas

(57) ABSTRACT

A tensioning device for traction device, particularly chains, comprises an element, particularly a tension shoe (1) that tensions the traction device. The tension shoe (1) is mounted on a pivot axle (2) for pivoting relative to a base element (3), and a spring element (4) acting between the tension shoe (1) and the base element (3) urges the tension shoe (1) against the traction device. To simplify the assembly of the tension shoe (1) and the base element (3), it is proposed that one of the elements (1, 3) comprises at least one mounting eye (6, 11) having a radial mounting aperture (7, 12) for radially receiving the pivot axle (2) arranged on the respective other element (1, 3).

7 Claims, 2 Drawing Sheets

CHAIN TENSIONER

FIELD OF THE INVENTION

The present invention concerns a tensioning device for traction means, particularly chains. Such chain tensioners are used, for example, for tensioning the timing chain and for tensioning the chain of auxiliary units of diesel and Otto engines.

BACKGROUND OF THE INVENTION

A chain tensioner of the pre-cited type is known, for example, from DE-A 195 36 643. A tension shoe is mounted on a pivot axle for pivoting relative to a base element. A spring means is arranged between the tension shoe and the base element to urge the tension shoe against the chain. The tension shoe comprises a closed mounting eye into which the pivot axle fixed to the base element is axially inserted. A perfect centering of the mounting eye with the pivot axle is required for the assembly of the base element and the tension shoe. Centering is achieved by a relative displacement of the base element and the tension shoe. After the centering operation, the pivot axle can be inserted into the mounting eye by an axial displacement of the base element and the tension shoe relative to each other. Thus, for assembling these elements, it is necessary to operate in different planes, and this is particularly disadvantageous in automated mounting.

SUMMARY OF THE INVENTION

It is therefore the object of the present invention to simplify the assembly of the two elements. The invention achieves this object by the fact that one of the elements comprises at least one mounting eye having a radial mounting aperture for radially receiving the pivot axle arranged on the respective other element. In the tensioning device according to the invention, the assembly of the two elements is effected in one plane or in parallel planes. The base element and the tension shoe must be aligned to each other only in such a way that as a result of relative radial displacement between the elements, the pivot axle engages into the radial mounting aperture and thus into the mounting eye. If the radial mounting aperture has a flared mouth, the introduction of the pivot axle is further simplified. In particular, radial displacements in a plane perpendicular to the one plane are not required. It is understood that the invention also applies to tensioning devices in which a tension roller is used in place of a tension shoe and is mounted for rotation on a lever which comprises the mounting eye according to the invention for receiving the pivot axle.

In other words, the tensioning device of the invention for a traction means is comprised of a tensioning shoe (1), that tensions the traction means, and comprising a further base element (3), on which the tensioning element (1) is mounted for pivoting on a pivot axle (2), a spring means (4) arranged between the elements (1, 3) urging the tensioning element (1) against the traction means, wherein one of the two elements (1, 3) comprises two horseshoe-shaped spaced-apart fork arms (5, 10) each of which comprises a mounting eye (6, 11) having a radial mounting aperture (7, 12) for radially receiving the pivot axle (2), and the other of the elements (1, 3) comprises a radial projection (1, 3) which engages between the forks (5, 10) and is overlapped by the forks (5, 10) on both the elements (1, 3) for snap engagement without a separate fastener, there are corresponding arranged retention surfaces (8, 9) which extend coaxially with the pivot axle (2) and which, within an operation-dependent pivoting range of the tensioning device, are situated opposite each other and face each other, a radial displacement of the pivot axle (2) out of the radial mounting aperture (7, 12) being prevented by a contact of the retention surfaces (8, 9) with each other.

Further embodiments of the invention offer other special advantages over prior art solutions. If one of the two elements comprises two spaced-apart fork arms and each of these fork arms comprises a mounting eye having the radial mounting aperture, the respective other element comprises a radial projection which is arranged between these fork arms and overlapped by both fork arms. Thus, after the assembly of the two elements, an axial slipping-apart of these elements is reliably prevented. In the prior art chain tensioner, it is necessary in some cases to use additional securing elements, for example a locking ring, which can be mounted only after the assembly of the two elements.

The pivot axle may be fixed, for example, on the base element and have ends projecting from both sides of the base element. Each of these ends then engages into one of the radial mounting apertures of one of the fork arms which are fixed on the tension shoe. The pivot axle may be made, for example, in one piece with the base element out of plastic. An equivalent solution consists in that the pivot axle is fixed on the tension shoe and has ends projecting from both sides of the tension shoe. Each of these ends then engages into one of the radial mounting apertures of one of the fork arms which are fixed on the base element. The tension shoe and the pivot axle can be made without any problem in one piece, for example, out of plastic.

Making the pivot axle in one piece with one of the two elements offers further advantages over prior art solutions. In prior art solutions, a separate pivot axle made of a metal is pressed into the base element. This necessitates the machining of a reception bore in the base element. Besides this, means have to be provided for securing the pin from falling out of the reception bore. This can happen if the pin and the base element are made of different materials having different thermal expansion properties and the tensioning device is subjected to high temperatures. All of these measures can be avoided if the pivot axle and the element concerned, i.e. the base element or the tension element, are made in one piece with each other. It goes without saying that these advantages are also obtained if, as in the prior art, the mounting eye for receiving the pivot axle has a closed configuration in peripheral direction.

To prevent the pivot axle from being displaced radially out of the mounting eye, it is proposed to arrange on both the elements, retention surfaces which extend coaxially with the pivot axle and which, within an operation-dependent pivoting range of the tensioning device, are situated opposite each other and face each other. A radial displacement of the pivot axle out of the radial mounting aperture is prevented by a contact of the retention surfaces with each other. The retention surfaces can be made by providing a convex retention surface on the tension shoe and a concave retention surface on the base element. Outside of the operation-dependent pivoting range of the tensioning device, the tension shoe can take a position of pivot relative to the base element in which the convex retention surface is disengaged from the concave retention surface. In this position of pivot, the pivot axle can be removed without any problem in radial direction out of the mounting eye. It is also possible to assemble the tension shoe and the base element in the said position of pivot. When the pivot axle has come into its pre-defined position in the mounting eye, the tension shoe can be pivoted about its pivot axle till the retention surfaces come to be situated opposite each other. In this arrangement, the pivot axle is retained perfectly in the mounting eye.

In the position of pivot intended for the assembly of the base element and the tension shoe, an additional securing device may become necessary for preventing the pivot axle from slipping radially out of the mounting eye. This is the case, for example, when the chain tensioner, pre-assembled in the above manner, has to be transported. It is adequate, in this case, to provide a constriction on the radial mounting aperture with a clear width smaller than the diameter of the pivot axle. In this embodiment of the invention, the pivot axle snaps into the mounting eye and a radial slipping out of the mounting eye is only possible by application of a higher force.

The embodiments of the invention described herein create tensioning devices for traction means which do not require additional securing means after the assembly of the base element and the tension shoe; the pivot axle is reliably retained in the mounting eye in a simple manner.

DETAILED DESCRIPTION OF THE DRAWINGS

Figure 1:
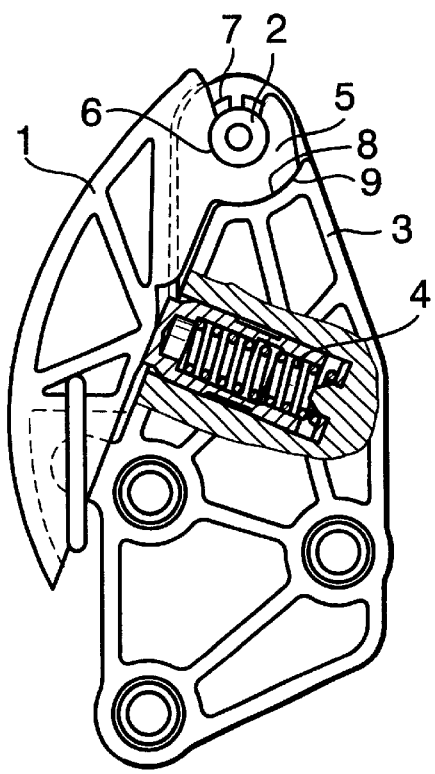
FIG. 1 is a view of a chain tensioner according to the invention.

In the chain tensioner according to the invention represented in FIG. 1, a tension shoe 1 is mounted on a pivot axle 2 for pivoting relative to a base element 3. Between the tension shoe 1 and the base element 3 is arranged a spring element 4 which is supported at one end on the base element 3 and, at the other end, urges the tension shoe 1 against a chain, not represented.

Figure 2:
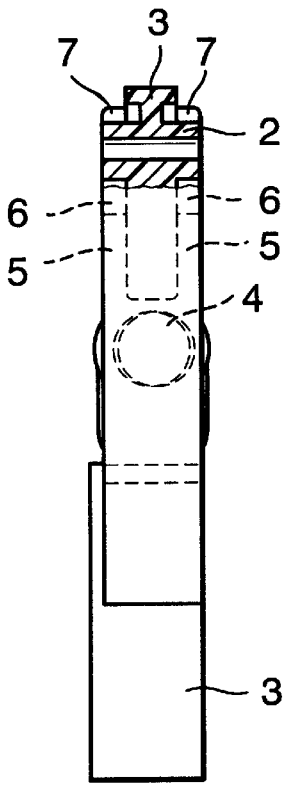
FIG. 2 is a top view of the chain tensioner according to the invention shown in FIG. 1.

As can be clearly seen in FIG. 2, the pivot axle 2 is made in one piece with the base element 3. The pivot axle 2 projects from the base element 3 on both sides. The tension shoe 1 comprises two spaced-apart fork arms 5 each of which comprises a mounting eye 6. Each mounting eye 6 comprises a radial mounting aperture 7, and the base element 3 is arranged between the fork arms 5. The fork arms 5 overlap the base element 3 radially and receive the ends of the pivot axle 2 in their mounting eyes 6. In this way, an axial fixing of the tension shoe 1 relative to the base element 3 is obtained.

The base element 3 comprises a concave retention surface 8 and the tension shoe 1 comprises a convex retention surface 8. Both the retention surfaces 8, 9 are arranged coaxially with the pivot axle 2 and are situated opposite each other. From FIG. 1 it can be seen that, in the shown position of pivot, the pivot axle 2 which is fixed on the base element 3 cannot be displaced out of the mounting eye 6 because the retention surfaces 8, 9 are pressed against each other in this direction of movement.

Figure 3:
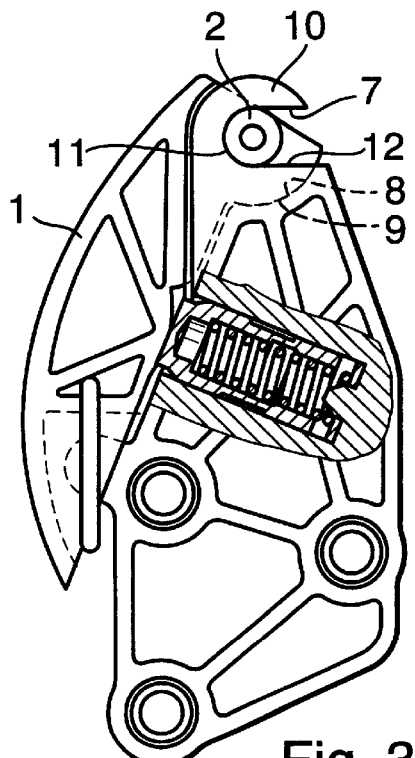
FIG. 3 is a view of a further chain tensioner according to the invention.
Figure 4:
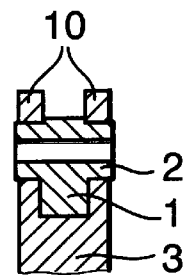
FIG. 4 is a partial top view of the chain tensioner shown in FIG. 3.

The tensioning device according to the invention represented in FIGS. 3 and 4 differs from that of FIGS. 1 and 2 mainly by the following features: The pivot axle 2 is fixed on the tension shoe 1 and projects from the tension shoe 1 on both sides.

The base element 3 comprises fork arms 10 between which the tension shoe 1 is arranged. Each of the fork arms 10 comprises a mounting eye 11, and each mounting eye 11 comprises a radial mounting aperture 12. The mounting eyes 11 receive the projecting ends of the pivot axle 2. It can be seen from FIG. 3 that, in the shown position of pivot, a radial outward displacement of the pivot axle 2 which is fixed on the tension shoe 1 is impossible because the retention surfaces 8, 9 are pressed against each other in this direction of movement. From FIG. 4 it can be seen that the tension shoe 1 is secured against axial displacement relative to the base element 3.

Figure 5:
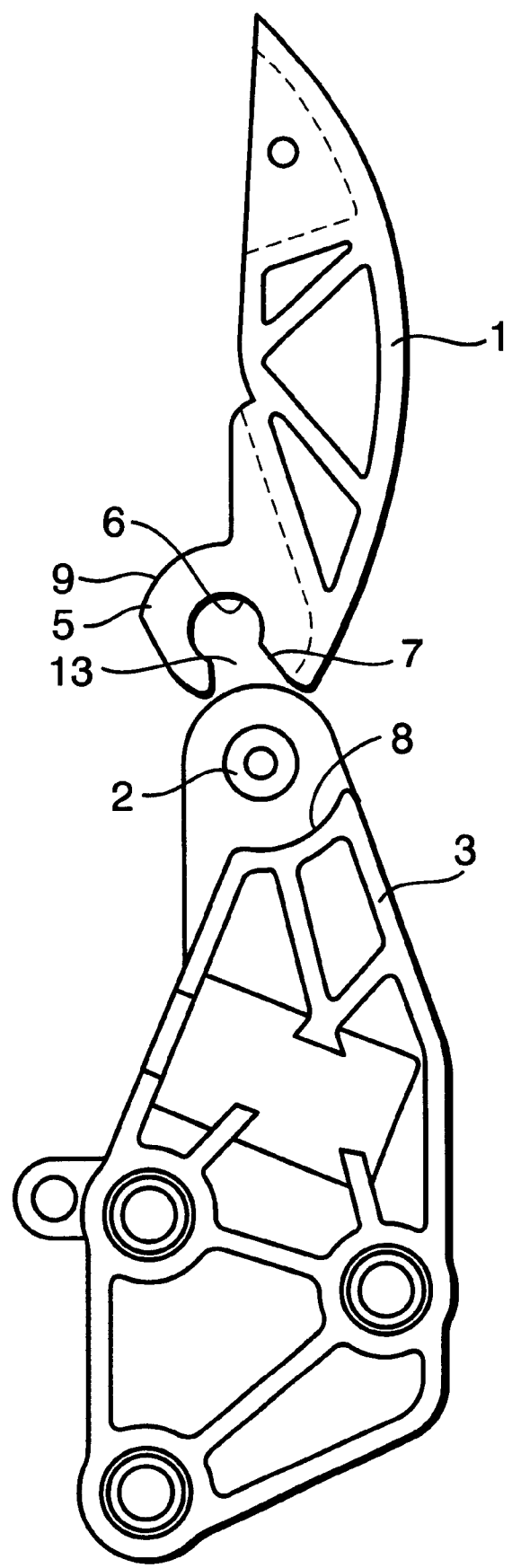
FIG. 5 shows the assembly of the chain tensioner according to the invention shown in FIG. 1.

Finally, FIG. 5 again shows the tensioning device according to the invention represented in FIG. 1, with the tension shoe 1 pivoted relative to the base element 3 so that the retention surfaces 8, 9 are disengaged from each other. In this position, the tension shoe 1 can be pushed without any problem onto the pivot axle 2. The representation also shows that, in the region of the mounting aperture 7, the tension shoe 1 comprises a constriction 13 whose clear width is smaller than the diameter of the pivot axle 2. During the insertion of the pivot axle 2 into the mounting eye 6, the fork arms 5 are deformed elastically so that the pivot axle 2 can pass the constriction 13 and come to be situated in the mounting eye 6.

LIST OF REFERENCE NUMERALS

1 Tension shoe
2 Pivot axle
3 Base element
4 Spring element
5 Fork arms
6 Mounting eye
7 Mounting aperture
8 Retention surface
9 Retention surface
10 Fork arms
11 Mounting eye
12 Mounting aperture
13 Constriction

What is claimed is:

1. Tensioning device for a traction means, comprising a tensioning shoe (1), that tensions the traction means, and comprising a further base element (3), on which the tensioning element (1) is mounted for pivoting on a pivot axle (2), a spring means (4) arranged between the elements (1, 3) urging the tensioning element (1) against the traction means, wherein one of the two elements (1, 3) comprises two horseshoe-shaped spaced-apart fork arms (5, 10) each of which comprises a mounting eye (6, 11) having a radial mounting aperture (7, 12) for radially receiving the pivot axle (2), and the other of the elements (1, 3) comprises a radial projection (1, 3) which engages between the forks (5, 10) and is overlapped by the forks (5, 10) on both the elements (1, 3) for snap engagement without a separate fastener, there are corresponding arranged retention surfaces (8, 9) which extend coaxially with the pivot axle (2) and which, within an operation-dependent pivoting range of the tensioning device, are situated opposite each other and face each other, a radial displacement of the pivot axle (2) out of the radial mounting aperture (7, 12) being prevented by a contact of the retention surfaces (8, 9) with each other.

2. Tensioning device according to claim 1 wherein the pivot axle (2) is fixed on the base element (3) and has ends projecting from both sides of the base element (3), each of which ends engages into one of the radial mounting apertures ((7) of one of the fork arms (5) which are fixed on the tension shoe (1).

3. Tensioning device according to claim 1 wherein the pivot axle (2) is fixed on the tension shoe (1) and has ends projecting from both sides of the tension shoe (1), each of which ends engages into one of the radial mounting apertures (12) of one of the fork arms (10) which are fixed on the base element (3).

4. Tensioning device according to claim 1 wherein the retention surface (9) on tension shoe (1) has a convex shape and the corresponding retention surface (8) on the base has a concave shape.

5. Tensioning device according to claim 1 wherein the radial mounting aperture (7) comprises a constriction (13) whose width is smaller than the diameter of the pivot axle (2).

6. Tensioning device according to claim 1 wherein the pivot axle (2) is made in one piece with one of the two elements (1, 3).

7. Tensioning device according to claim 1 wherein the pivot axle (2) is made in one piece with one of the two elements (1, 3).

* * * * *